United States Patent [19]
Moreyra

[11] Patent Number: 6,046,563
[45] Date of Patent: *Apr. 4, 2000

[54] HAPTIC DEVICE

[76] Inventor: Manuel R. Moreyra, 4729 40th Ave. NE., Seattle, Wash. 98105

[*] Notice: This patent issued on a continued prosecution application filed under 37 CFR 1.53(d), and is subject to the twenty year patent term provisions of 35 U.S.C. 154(a)(2).

[21] Appl. No.: 09/136,703

[22] Filed: Aug. 19, 1998

[51] Int. Cl.[7] .................................................. G05B 19/10
[52] U.S. Cl. ......................... 318/567; 318/560; 318/566; 318/570; 187/7; 33/18.1
[58] Field of Search ................................... 318/567, 560, 318/566, 570; 187/7; 33/18.1

[56] References Cited

U.S. PATENT DOCUMENTS

| | | | |
|---|---|---|---|
| 4,560,046 | 12/1985 | Lorello et al. | 192/11 |
| 4,600,083 | 7/1986 | Parent et al. | 187/7 |
| 4,663,822 | 5/1987 | Blaha et al. | 29/564.4 |
| 4,697,348 | 10/1987 | Parent et al. | 33/18.1 |

Primary Examiner—Karen Masih
Attorney, Agent, or Firm—Graybeal Jackson Haley LLP

[57] ABSTRACT

A pair of orthogonally oriented linear member are slidingly linked to a base at their respective ends. A stage, having a pair of orthogonally oriented bores, receives the pair of linear members, thereby permitting the stage to move in any horizontal direction. The stage further has two parallel, vertically oriented bores to receive a pair of parallel, vertically oriented linear members. The adjacent ends of the vertically oriented linear members are connected by upper and lower platforms, each having a cable guide thereat. A motor is mounted to the base and is coupled to a drive shaft. A hangar, fixedly mounted to one of the horizontal linear members, rotationally hold a first drive pulley which is slidably mounted on the drive shaft. Located opposite the drive pulley and also fixedly mounted to the horizontal linear member is a cable hangar. A cable frictionally engages the drive pulley to translate rotational movement of the drive pulley into vertical movement of the platforms. This is accomplished by placing first, second, third, and fourth lateral cable guides at the stage with the first and fourth being proximate to one another and the second and third being proximate of one another. The cable extends from the hangar, in order, to the first lateral guide, the upper platform guide, the second lateral guide, the drive pulley, the third lateral guide, the lower platform guide, and the fourth lateral guide where after it again terminates at the fixed hangar. Each horizontal linear member may also be linked to a motor to supply motive forces to the stage for horizontal movement.

26 Claims, 9 Drawing Sheets

HAPTIC DEVICE

FIELD OF THE INVENTION

The present invention relates to an apparatus, namely a haptic device, which provides force feedback simulation to humans interacting with virtual or remote environments. The apparatus permits a human operator to manually direct a remote robot arm or other slave device. In a broad sense, the apparatus establishes a kinesthetic coupling between a human operator and a virtual or remote environment.

BACKGROUND OF THE INVENTION

Despite advances in computer science, there are many applications and tasks that are too complex or unstructured to be performed by unsupervised autonomous robots. Until machine intelligence is significantly improved, there will be a continuing need for direct human supervision and control for all but the simplest of tasks performed by robotic systems. Direct human control is made possible through the use of a teleoperator. A teleoperator is a general-purpose, remotely controlled, dexterous person-machine system. Teleoperators may be used to control devices in either a remote or virtual environment.

Often it is necessary to have a human operator physically removed from the actual work site, remotely operating and supervising the robot in the performance of difficult and dangerous tasks. Another application is virtual operation, in which a human can touch and/or manipulate objects in a virtual environment. Among these applications, medical simulation can allow users to explore anatomy and actually feel realistic representation of various tissues, perform virtual surgery or fly through arteries. Other virtual environment applications with force feedback include engineering, education, assisting disabled individuals, and entertainment.

In very simple systems the human operator is not provided with any sensory input from the remote manipulator other than the location of the manipulator relative to its environment (usually by the direct viewing of the operator when the manipulator arm is within view or via a camera when the manipulator is in a remote location). While visual observation may be enough sensory input for some tasks it often leaves the human operator feeling disconnected from the task because it provides the operator with a very low level telepresence. Telepresence is the quality of sensory feedback from a teleoperator to a human operator such that the operator feels present at the remote site.

An increased telepresence makes it possible for a human operator to undertake tasks which would be difficult or impossible with only visual feedback. Quality remote or virtual surgery, for example, would not be possible with only visual information being provided to the operator. In order to increase the operator's telepresence a haptic display is used to provide increased sensory feedback.

A haptic display generally includes several structural members connected at joints that permit relative movement of the members as the operator moves an associated control handle. As the operator moves the handle around a defined workspace, a control computer reads signals indicative of movements of each member and calculates the position of the handle relative to a defined reference. The computed information is then used to control the corresponding motion of a remote or virtual manipulator.

The forces and torque applied by the telemanipulator in a remote environment, or virtual manipulator in a virtual environment can be sensed or estimated by various techniques. A force/torque sensor may be mounted on the end-effector of the telemanipulator to directly measure the forces and torque encountered. In virtual environments, the virtual objects can be modeled as spring elements with a finite stiffness, and the forces and torque can be estimated by the intersection among the virtual objects.

The control computer transforms the measured or estimated forces and torque signals into appropriate output signals to control and reproduce a scaled representation of the forces and torque encountered in the remotes or virtual environment. The human operator thus appears to feel forces and torque exerted by the remote or virtual environment.

SUMMARY OF THE INVENTION

The present invention is embodied in a multiple-degree-of-freedom haptic simulator device for use as a man-machine force reflecting interface in teleoperated systems and virtual environment simulations. In the disclosed embodiment, the three-dimensional active motion/force of a handle located on a sliding platform is transmitted through three prismatic, sliding joints arranged in an orthogonal configuration on a mechanical base. The sliding movements in a preferred embodiment are along linear axes, and hence the apparatus may be referred to as a linear haptic display or LHD. A fourth passive degree-of-freedom may be provided to permit the handle to freely rotate relative to the vertical axis. Motive force to the three active prismatic joints are supplied by motors, tangential pulleys, and steel cables.

Both passive and active movement of the LHD platform is carried out by a series of prismatic, sliding joints taking the form of support shafts slidingly supported by the mechanical base of the invention. A first support shaft or rail is slidingly mounted to the base and defines a first direction of movement; a second support shaft or rail is also slidingly mounted to the base and defines a second direction of movement that is substantially orthogonal to the first direction of movement. Both support shafts are preferably rotationally fixed, and are confined to a single plane of movement, e.g., X and Y axes. A stage is slidingly coupled to the first and second support shafts so that if either or both shafts are caused to move with respect to the base, a minimal level of resistance by the stage to such movement is encountered. The stage further defines at least one bore sized to receive at least a third support shaft oriented in a direction orthogonal to both the first and second directions of movement. A movable platform or sliding column comprising a pedestal connected to an entablature by way of at least the third shaft, and preferably additional supporting structure, operates in the preferred vertical or Z axis direction (that direction being orthogonal to the first and second directions).

Motive force to the stage is provided in a preferred embodiment by three motors located on the base to minimize inertial resistance of the moving components of the LHD. A first motor is mounted to the base and operatively linked to a first drive shaft, preferably an axially splined or grooved drive shaft, that rotates relative to the base and has an axially slidable drive pulley disposed thereon. The first drive shaft is supported by the first motor at one end and by a drive shaft hanger rotationally linked to the drive pulley and slidably engaged with the base. Depending upon design considerations, the drive shaft hanger can be coupled to a sliding support shaft so that the two components will move simultaneously. As a consequence of this geometry, the drive pulley can either rotate with the drive shaft, or axially slide on the first drive shaft, or both.

A second motor is mounted to the base and is operatively linked to the first support shaft, preferably by means of a pulley and cable motive force transmission system; a third motor is mounted to the base and operatively linked to the second support shaft, preferably also by means of a pulley and cable motive force transmission system. Each pulley and cable motive force transmission system acts on a respective support shaft to cause linear movement of the support shaft relative to the base. While it is contemplated that other means for imparting motion to the first and second support shafts are possible, such as by locating servo motors on shaft supporting structure, a negative consequence of such design would be to increase the inertia of the moving components of the apparatus, whether at rest or in motion. In the preferred embodiment, a cable motive force transmission system provides the desired consequence without incurring the overhead of increased inertia. For these same reasons, operation of the sliding column is also carried out by way of a cable motive force transmission system as will be described next.

The platform or sliding column in a preferred embodiment is responsive to the rotation of the first motor acting on the first drive pulley. To permit vertical actuation of the sliding column or platform (the pedestal, the entablature and at least the third shaft) without restricting orthogonal movement of the stage, a cable motive transmission system is used that includes a plurality of idler pulleys. A cable hanger substantially opposite the location of the first drive pulley acts as a terminus for the platform motive transmission cable. A first end of the cable is attached to the hanger and is redirected to an upper portion of the sliding column by a first lateral idler pulley. A first column end idler pulley located at the upper portion redirects the cable to a second lateral pulley. The redirection leads the cable to the drive pulley where after the cable is redirected back towards the stage to a third lateral pulley. From here, the cable is further redirected to a second column end idler pulley located at a lower portion of the column and subsequently redirected to a fourth lateral idler pulley where after the cable terminates at the cable hanger, thus completing the cable transmission loop. Preferably, each lateral idler pulley is rotatably located in the stage and each column end idler pulley is rotatably located in the column assembly.

In this first preferred embodiment, linear ball bearings (ball bushings) are disposed in the stage, since all stage versus shaft movements are axial. Each support shaft that passes through the stage and that slidingly engages the base, does so by way of a slide member disposed at either end of the shaft. Each slide rides on a corresponding rail attached to the base. The first drive shaft is preferably grooved to accept a ball spline cylinder that axially slides on the drive shaft but cannot rotate independently of the drive shaft. The first drive pulley is preferably fitted on the ball spline cylinder and supported by the base by a ball bearing assembly linked to base by a slidable hanger. Thus, the drive pulley axially slides relative to the base, on the drive shaft, by way of the ball spline cylinder, and rotates relative to the base by way of the ball bearing assembly that is linked to the base by the sliding hanger.

With respect to the sliding column, it preferably comprises, in addition to the third support shaft, a fourth support shaft and two auxiliary tubes. Each column support shaft is constructed of light but rigid material so provide structural rigidity to the column without causing excess inertial resistance. The use of thin wall hollow steel shafts achieves a system with lower inertia while maintaining a high relative stiffness. Optionally, light carbon fiber tubes or rods can be inserted in the hollow shaft with a thin layer of viscoelastic material between them. This compound construction adds stiffness and damping to the shafts with are simultaneously beams and rails. Since all four shafts need not engage the stage, the first preferred embodiment has only two column support shafts engaging linear bearings in the stage, with the auxiliary tubes, preferably constructed of a carbon fiber composite, passing adjacent thereto and connecting the pedestal to the entablature.

An alternative preferred embodiment utilizes much of the same construction as the first embodiment. However, instead of using a sliding column, a vertical slide moves within the bounds of a vertically stationary column. By incorporating additional idler pulleys in the cable transmission system for vertical platform movement, results similar to that of the first preferred embodiment are possible without encountering a large column rising or falling with respect to the base, making the alternative embodiment more compact.

The LHD according to the preferred embodiments provide a human with a natural and intuitive means for interacting with virtual and remote environments. The features of this design provide excellent kinesthetic feedback, a kinematically simple structure, mechanically decoupled motion in all four degrees of freedom, and zero backlash. In addition, the LHD has a large workspace, high force output, low friction, high stiffness and responsiveness. The mass of the LHD is distributed to provide low and isotropic inertia in all the three active degrees of freedom.

DETAILED DESCRIPTION OF THE INVENTION

Figure 1:
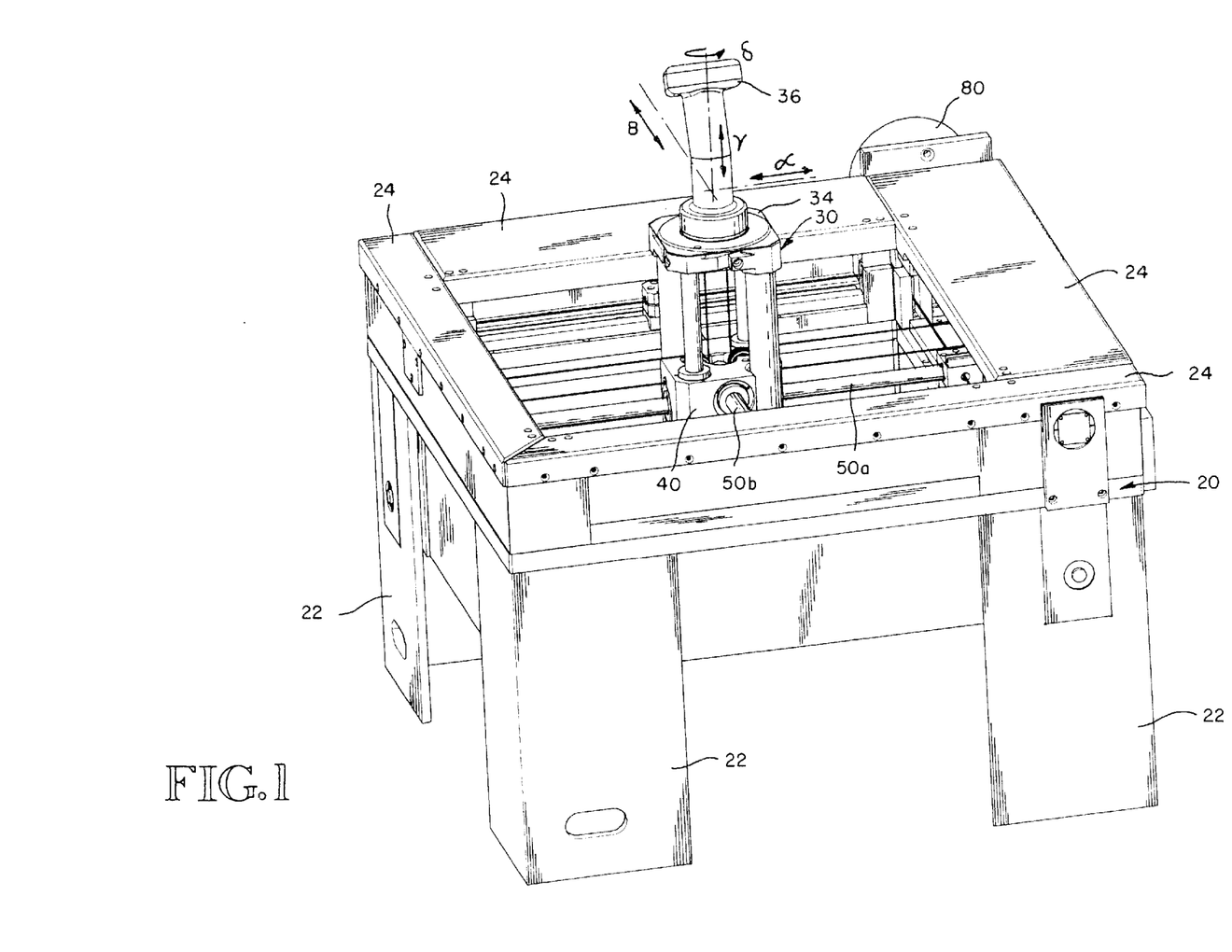
FIG. 1 is a perspective view showing the linear haptic display according to the present invention in which a user interface, such as a handle, is mounted on the entablature of the sliding column.

Turning now to the several figures wherein like numerals indicate like parts and more particularly to FIG. 1, a first preferred embodiment of the present LHD invention is shown. The user interface with the LHD is accomplished by control handle 36, which is mounted on sliding column assembly 30 disposed within the rectangular opening defined by covers 24. Control handle 36 transmits the contact force from the LHD to the user's hand and optionally, through an associated electrical circuit (not shown), permits the user transmit position commands to an input device such as a control computer. While not the subject of the present invention, relevant handle position information may be obtained from shaft encoders located at each motor (described below) that provide relative rotary position information to the computer. All relevant components of the LHD are supported by table base 20. Post legs 22 support table base 20 at a height such that sliding column 30 will not reach the lower end of the post legs 22. For convention purposes, the linear X-axis of sliding column 30 and control handle 36 is indicated by line $\alpha$; the linear Y-axis of sliding column 30 and control handle 36 is indicated by line $\beta$; the linear Z-axis of sliding column 30 and control handle 36 is indicated by line $\gamma$. The rotational Z-axis of control handle 36 is indicated by line $\delta$.

Figure 2:
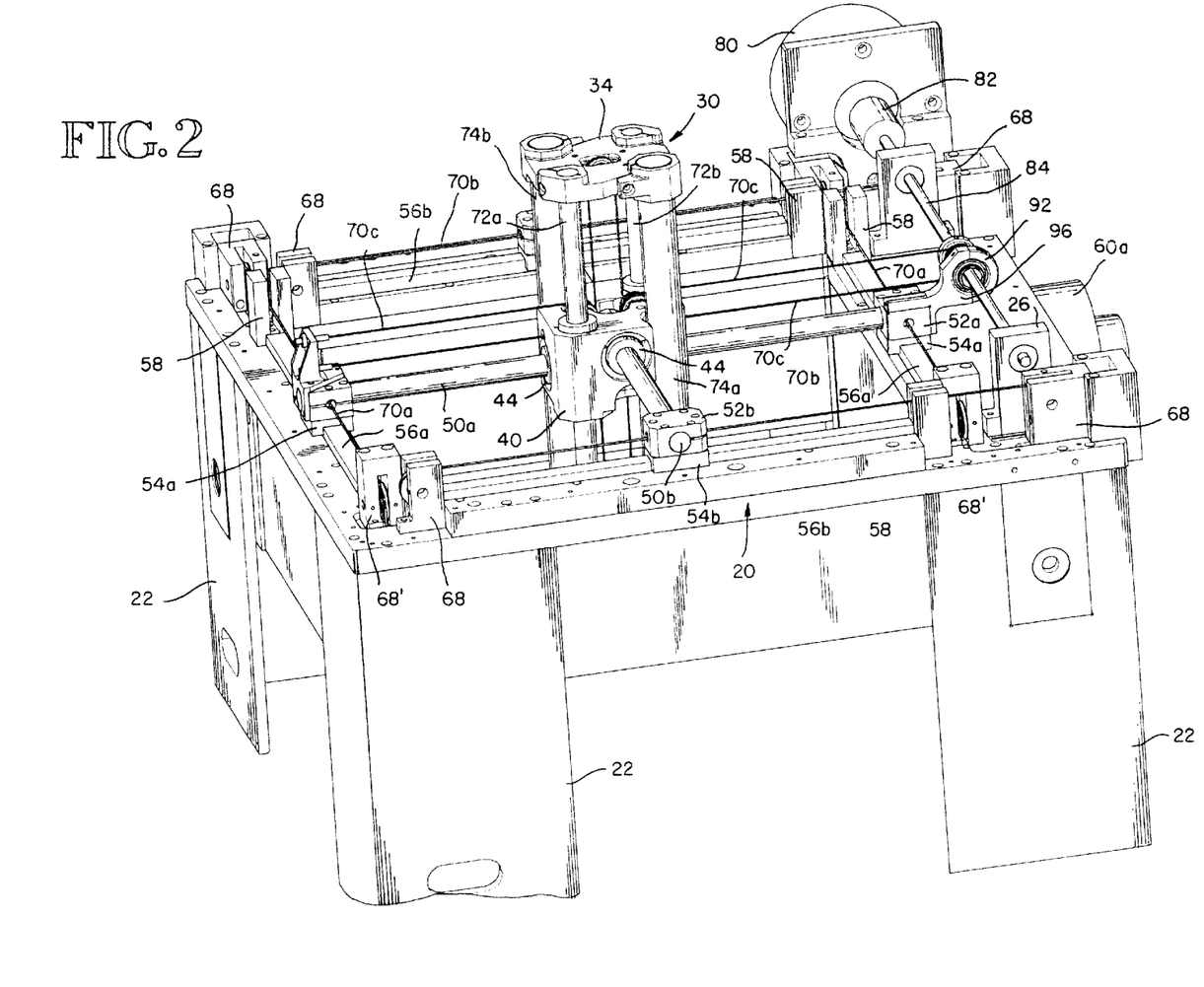
FIG. 2 is a perspective view showing the linear haptic display without handle and without top covers.

FIG. 2 details the predominantly fixed structures of the LHD invention. To assist in horizontal motive transmission, four hangers 68 are mounted on table base 20. An idler pulley 66 (see FIG. 6) is mounted to a fixed shaft disposed in each hanger. These idler pulleys regulate movement along the linear X-axis and the linear Y-axis. Hangers 68' are also mounted on table base 20, each having a channel in which an idler pulley 66 (see FIG. 6) is mounted. These hangers also provide a mechanical limit to the horizontal displacement of slide 54. Also performing this function are bumpers 58, U-shaped stops mounted on table base 20. Shaft support 26 is rigidly affixed to table base 20, and has a pair of ball bearings to rotationally hold spline shaft 84. Spline shaft 84 is operatively connected to electrical rotary motor 80 by coupling 82.

Figure 5:
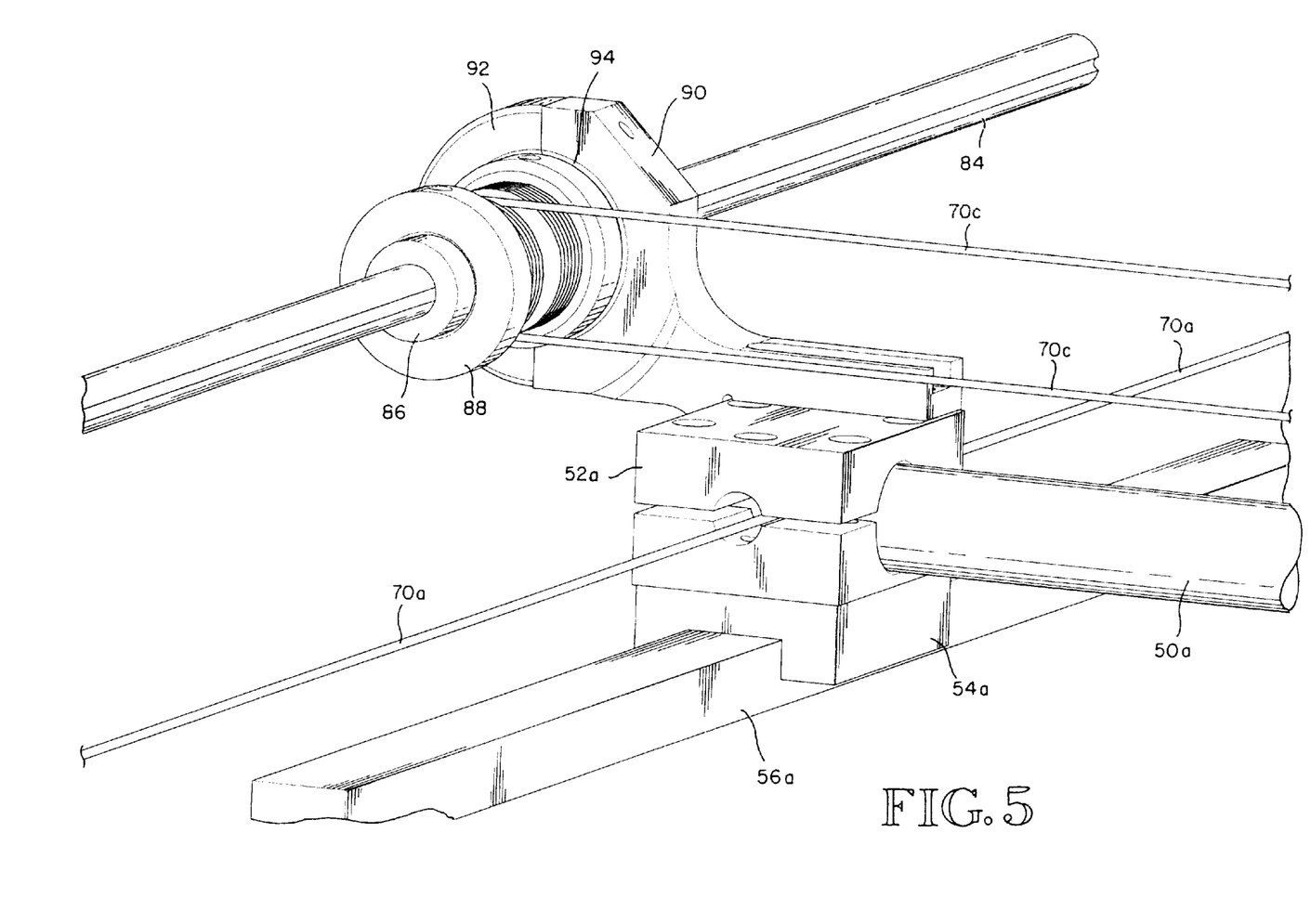
FIG. 5 is a detailed perspective view of a ball spline cylinder and drive pulley assembly mounted to the splined shaft with a transmission cable wrapped there about for controlling the vertical axis height of the sliding column.

Referring momentarily to FIG. 5, spline shaft 84 is preferably a grooved shaft around which is located ball spline cylinder 86. Cylinder 86 is constructed so that it cannot rotate relative to spline shaft 84, however, spline shaft 84 does serves as a linear rail for ball spline cylinder 86. Thus, ball spline cylinder 86 functions as a linear ball bearing that moves linearly with respect to spline shaft 84, but cannot rotate about the axis of the shaft. Hanger 90 and bearing cap 92 link spline external cylinder 86 to a shaft block 52a, which is located on slide 54a. Thus, hanger 90 keeps spline external cylinder 86 and shaft block 52a at a constant relative distance, such that spline external cylinder 86 moves parallel to the Y-axis $\beta$.

Figure 3:
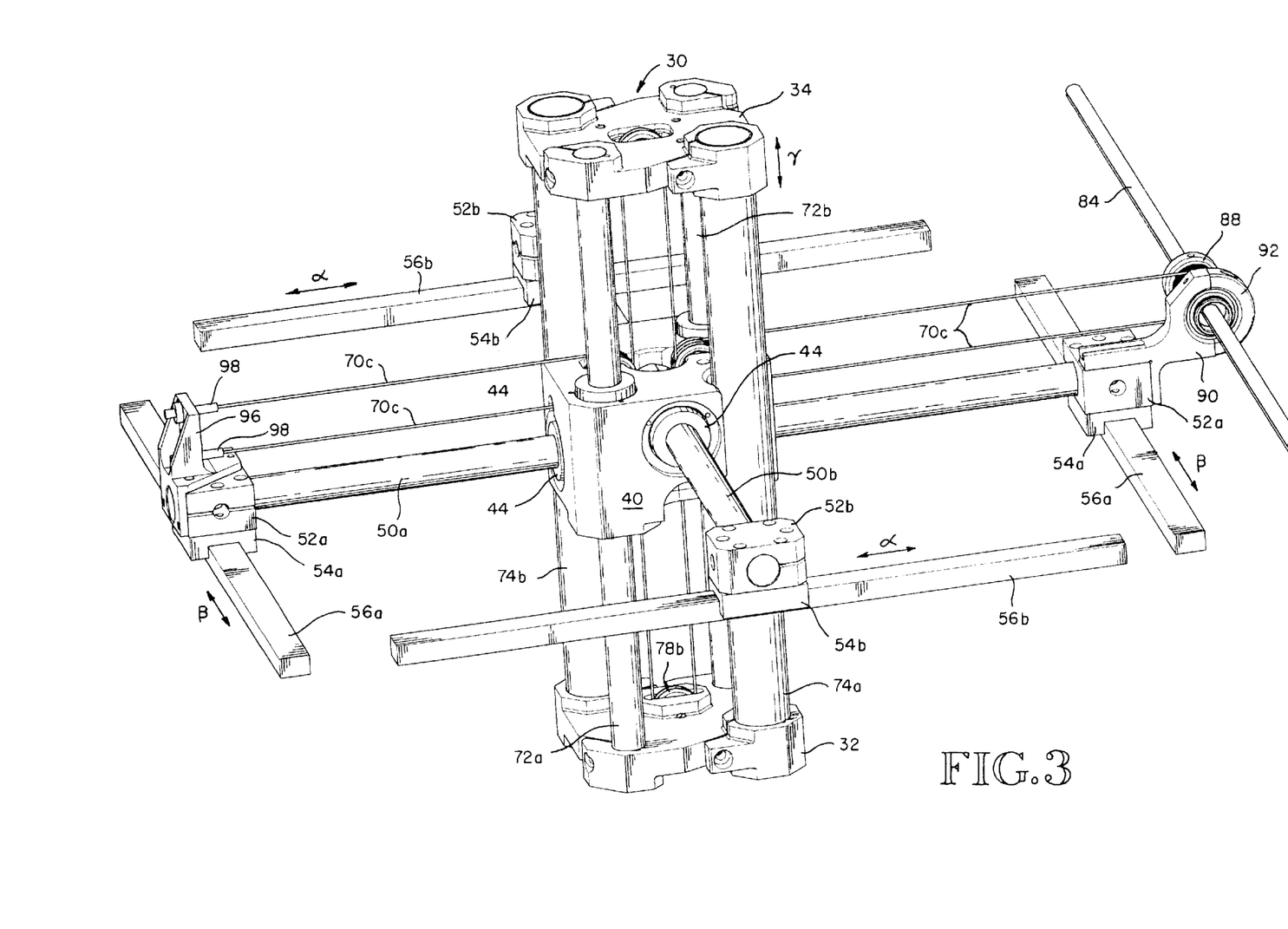
FIG. 3 is an isolated view illustrating the two pairs of lateral and horizontal parallel prismatic joints without cable transmission systems and the vertical prismatic joint with a cable transmission system.
Figure 7:
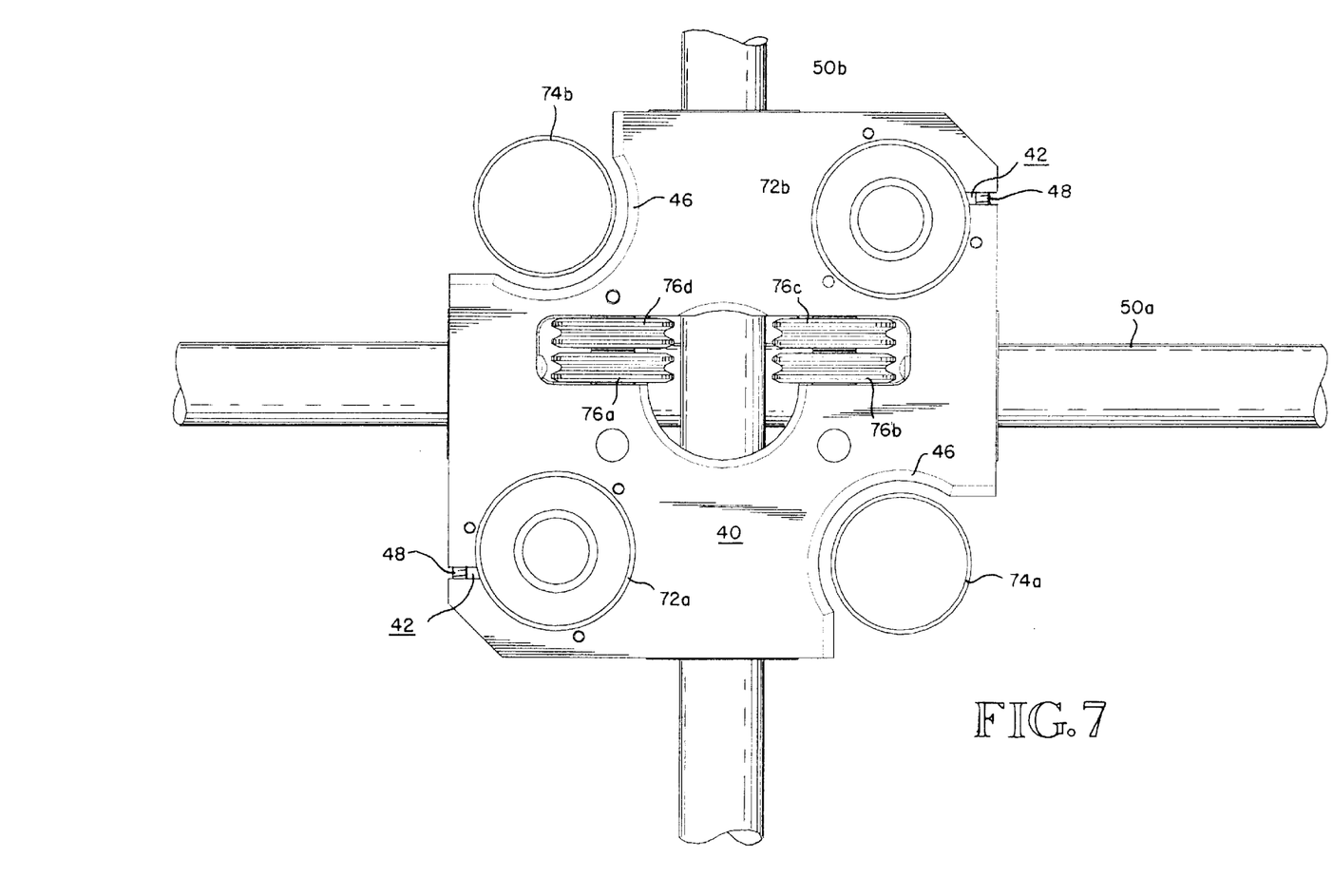
FIG. 7 is a plan view of the sliding column stage showing the selective engagement of horizontal and column support shafts therewith.

Turning then to FIG. 3, selective structure relating to the movement of sliding column 30 are best shown. Sliding column 30 comprises stage 40 through which a pair of horizontal hollow support shaft/rails 50a and 50b, and a pair of vertical support shaft/rails 72a and 72b pass. A pair of carbon fiber tubes 74a and 74b, serving as light weight structural elements for column 30, pass adjacent to cutouts 46 of stage 40 (see FIG. 7). Sliding column 30 also comprises pedestal 32, entablature 34, a series of idler pulleys 76 and 78, and linear bearings 44 (shown best in FIG. 7). The hollow support shaft/rails are manufactured from thin walled steel tubing that have had their external surfaces hardened and precisely ground to closely fit the internal diameter of bearings 44. Thus, shaft/rails 50 and 72 function as rails for linear ball bearings 44. Linear ball bearings 44 are essentially bushings with rows of circulating bearing balls for reduced rolling friction. Shaft blocks 52 function as horizontal shaft anchors and consequently have one side bolted to slide 54, thus radially clamping a horizontal shaft/rail 50. Each slide 54 is a linear ball bearing that slides with respect to a corresponding rail 56. Each slide 54 can support forces in all directions perpendicular to the rail axis and can support torque in any direction. Each track rail 56 is a grooved rail that acts as a linear guide for slides 54, and each is bolted to table base 20 with one side of a rail 56 being in contact with one of the shoulders of table base 20.

Figure 6:
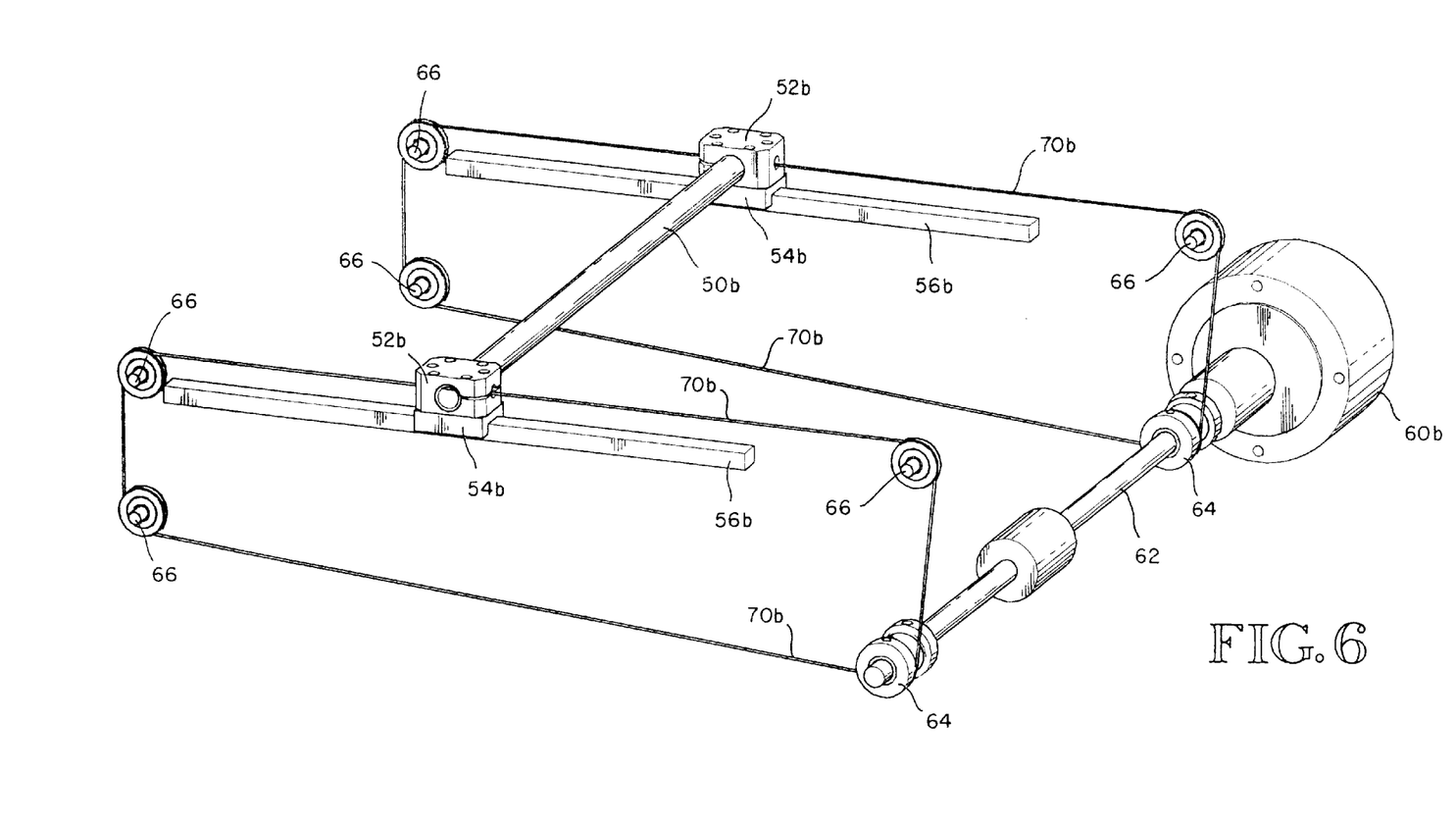
FIG. 6 illustrates one of the horizontal transmission systems with parallel prismatic joints and dual drive pulley actuation.

Motors 60a and 60b transmit rotary motion to linear motion of support shafts 50a and 50b via a motive force transmission system. As best shown in FIG. 6, for example, motor 60b causes rotation of drive shaft 62 by way of coupling 64. Drive shaft 62 is positioned parallel to shaft 50b. A pair of drive pulleys 64 are operatively linked to a plurality of idler pulleys 66 by way of a pair of cables 70b in a loop. Each cable 70b loop has two stretches that begin in a respective shaft block 52b and terminates in the related drive pulley 64. Thus, by operation of motor 60b, support shaft 50b is caused to move along rails 50b. A similar power transmission system is employed with respect to support shaft 50a.

Figure 4:
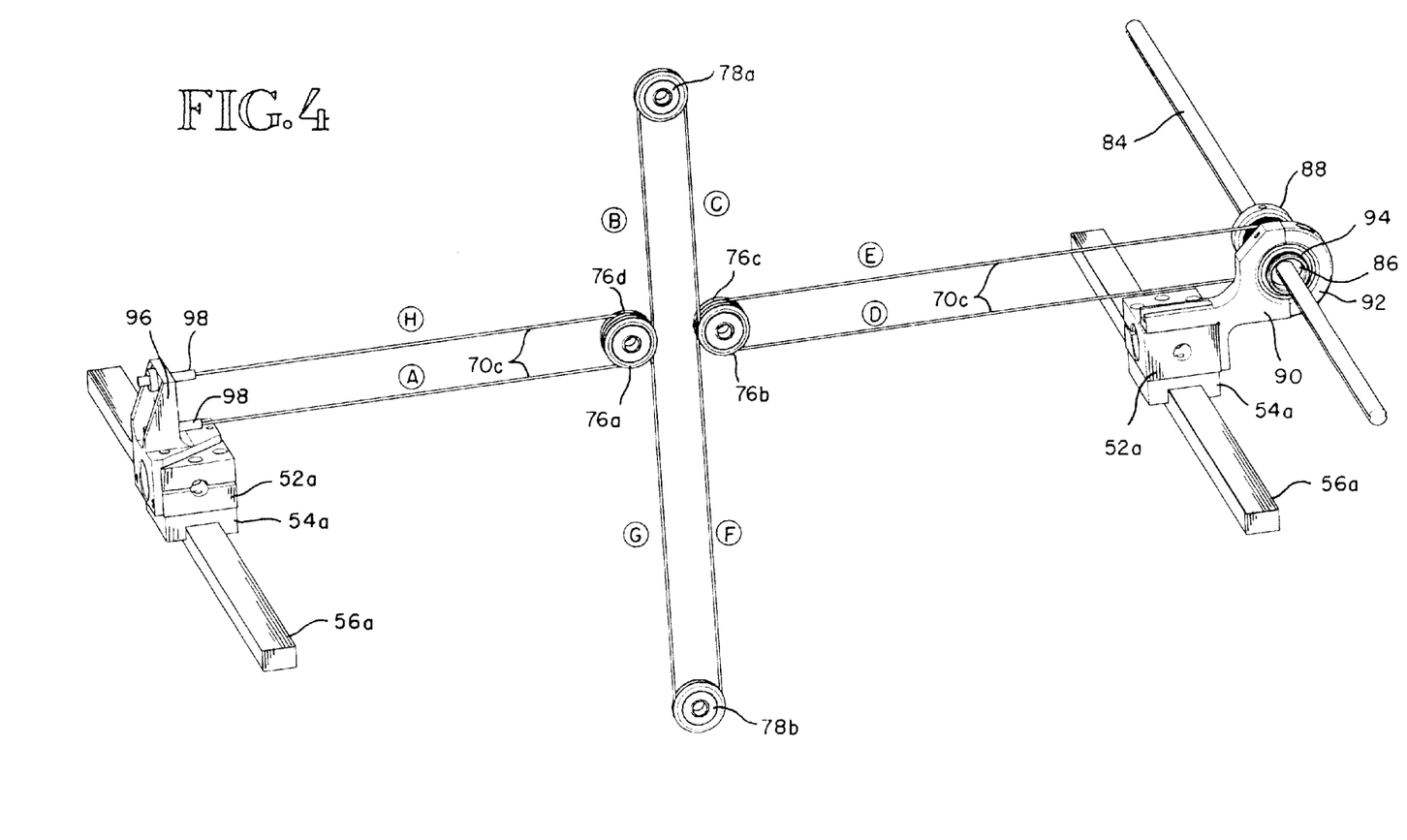
FIG. 4 illustrates the vertical joint pulley/cable transmission system utilizing a horizontally positioned splined drive shaft and axially slidable drive pulley wherein the drive pulley is slidably linked to the base by way of a rotary bearing and hanger combination that is fixed to a slide and track combination.

Referring to FIGS. 4, 5 and 6, and initially to FIG. 4, the transfer of motive force to the sliding column will be described in more detail. A significant improvement over the prior art haptic displays concerns the present invention's means for imparting Z-axis $\gamma$ movement to column 30. The means shown in FIG 4 permits column 30 to move in the $\alpha$ and $\beta$ directions while still permitting unfettered Z-axis $\gamma$ movement. As shown therein, cable hanger 96 is mounted above and to shaft block 52a. Cable hanger 96 provides a suitable means for anchoring cable 70c, which is positioned parallel to shaft 50a so that movement of the sliding column along shaft 50a causes a similar linear movement with respect to cable 70c. While a continuous cable could be used, by utilizing a pair of threaded plugs 98 swage fitted to cable 70c, tension adjustments to cable 70c can be easily carried out. Thus, holes (not shown) are formed in hanger 96 to receive threaded plugs 98. In the preferred embodiment cable 70c (as well as cables 70a and 70b) is a stranded stainless steel cable since a cable of such construction has lower friction and a higher stiffness to volume ratio than equivalent rubber timing belts. Drive pulley 88 is a spiral groove pulley mounted on spline external cylinder 86, and transforms the torque from the spline shaft 84 into tangential forces which are transmitted to column 30 (or column 30' in an alternate embodiment shown in FIG. 11) through idler pulleys 76a–d and 78a–b, and steel cable 70c.

Beginning at cable segment A shown in FIG. 4, cable 70c extends from hanger 96 and is redirected by lateral pulley 76a towards column end pulley 78a, indicated as segment B. Column end pulley 78a redirects cable 70c to lateral pulley 76b (segment C) where cable 70c is redirected to drive pulley 88 as shown by segment D. After engaging drive pulley 88, cable 70c terminates thereat. A second cable 70c is anchored to drive pulley 88 and wrapped there about, and is redirected as shown by segment E towards lateral pulley 76c. Lateral pulley 76c causes cable 70c to be redirected towards column end pulley 78b (segment F) which in turn redirects the cable (segment G) to lateral pulley 76d. Lateral pulley 76d causes cable 70c to be redirected towards hanger 96 (segment H) whereat it terminates. It is important to note that the disclosed geometry is responsible for the motive flexibility. The fact that pulleys have been used should not prevent the possible use of other cable redirection means such as ferrules, guides and the like. Similarly, other geometric force redirection schemes may be employed (for example, the configuration shown in FIG. 11 or using only half of the structure and have the sliding column biased for movement) without departing from the scope of the invention.

As described previously and referring to FIGS. 3 and 7, stage 40 is preferably formed from a milled aluminum block that defines a plurality of apertures to accommodate support shafts 50a and 60b, and 72a and 72b along the X, Y, and Z axes as shown. Each support shaft slides relative to stage 40 through a pair of linear bearings 44 that are radially held in compression by bolts 48 acting to close a clamp gap 42. Pedestal 32 is at the bottom of column 30 and is formed from an aluminum block, as is entablature 34, which is located at the top of column 30. In addition to support shafts 72a and 72b are carbon fiber auxiliary tubes 74a and 74b.

Figure 8:
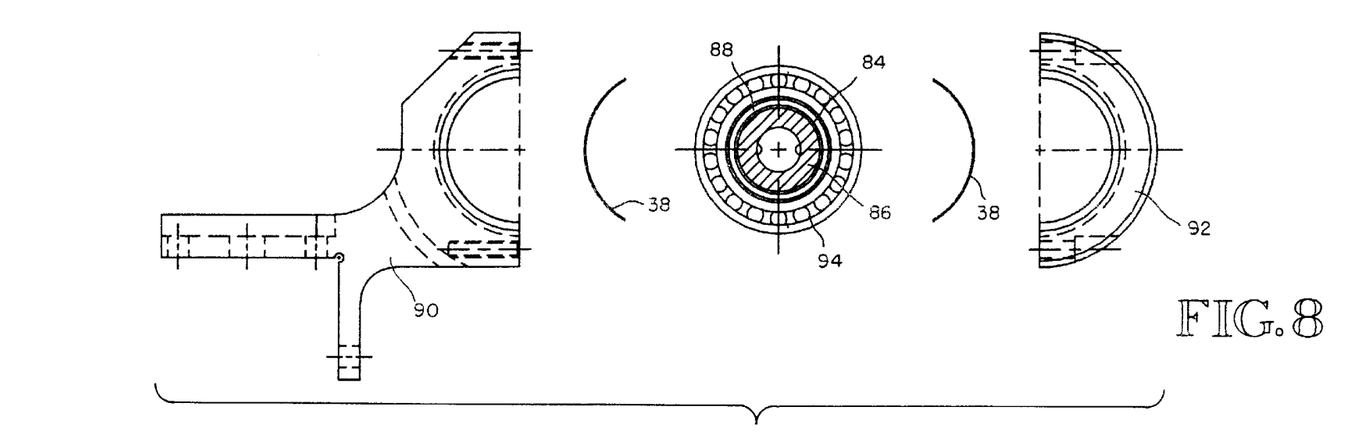
FIG. 8 is an exploded cross-sectional view showing the ball spline and connector assembly with two viscoelastic layers filling their gap.

FIG. 8 details the engagement between ball bearing 94 and hanger 96 with a first viscoelastic material 38 filling the gap between ball bearing 94 and hanger 96, and a second viscoelastic layer filling the gap between ball bearing 94 and bearing cap 92. In so doing, a more secure mounting is established as well as a reduction in vibration transmission through increased damping.

Figure 9A:
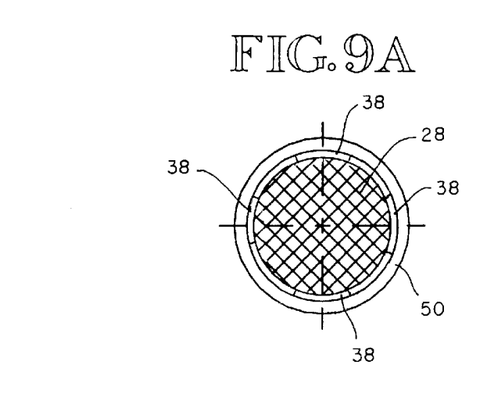
FIGS. 9A and 9B are cross sectional views showing the hollow shafts with a coaxial carbon fiber tube or rod and with viscoelastic material filling the gap between the carbon fiber and the hollow shaft.
Figure 9B:
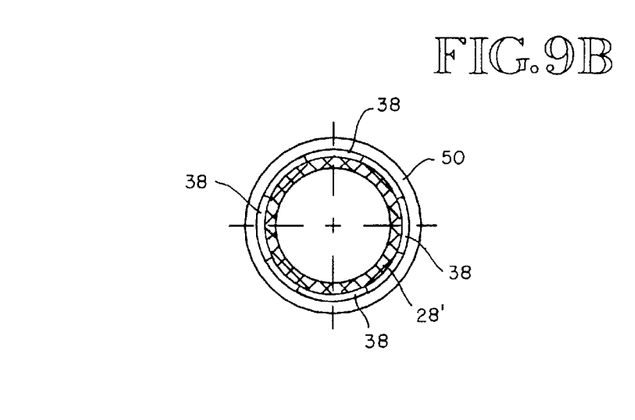

FIG. 9a details a support shaft/rail 60 or 72 (60 being shown for illustrative purposes) with a coaxially positioned carbon fiber rod 28 and viscoeleastic material 38 filling the gaps there between. The viscoeleastic material 38 is a polymer with superior dampening qualities. FIG. 9b shows a support shaft/rail with a coaxially positioned carbon fiber tube 28' and viscoeleastic material 38 filling the gaps there between.

Figure 10:
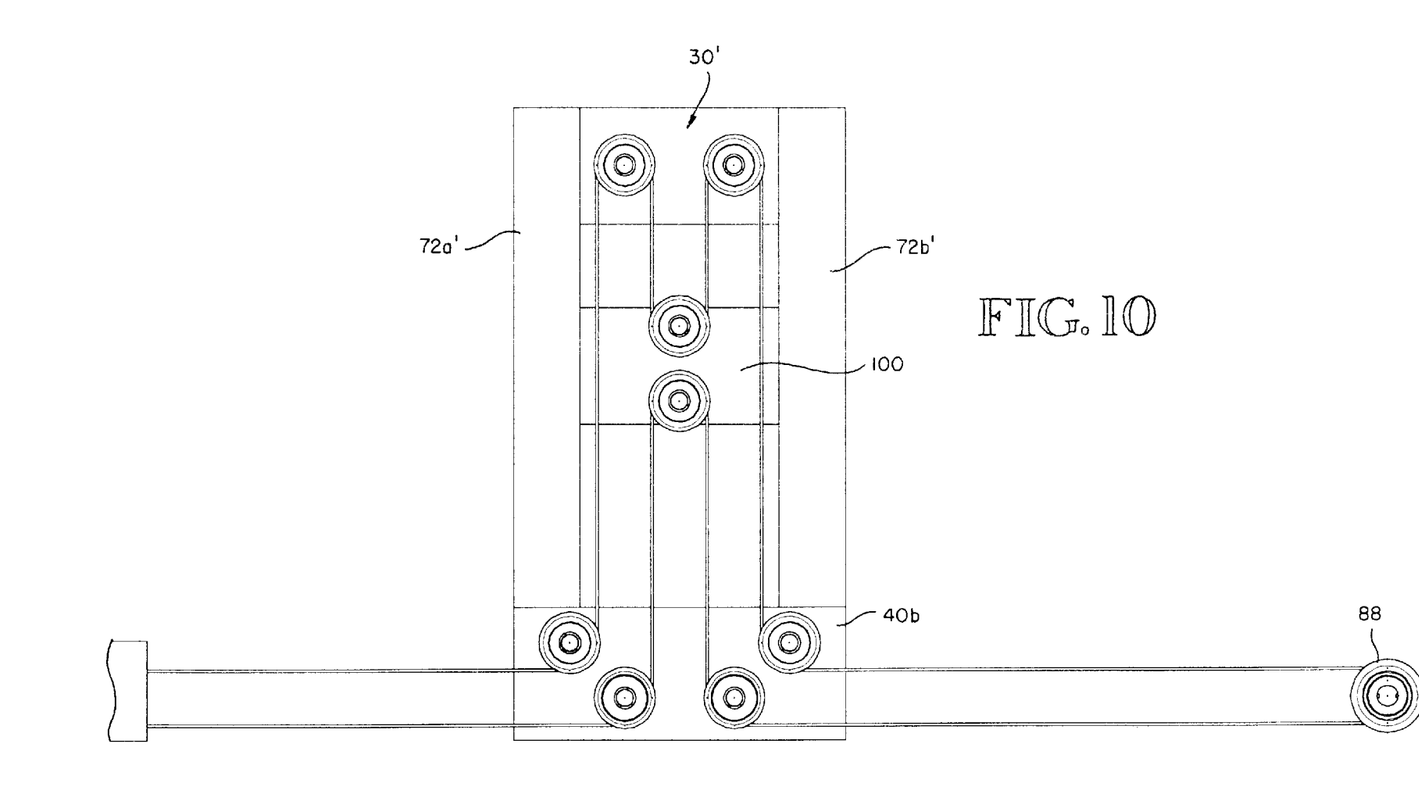
FIG. 10 is a functional illustration of an alternative embodiment for imparting vertical movement to the vertical joint with a vertically fixed column and an internal sliding block.

FIG. 10 shows alternative vertically fixed column assembly 30' which may be used in place of column assembly 30. Fixed column assembly 30' comprises two vertical support shaft/rails 72a' and 72b', two carbon fiber tubes 74a' and 74b', fixed column stage 40', and a plurality of idler pulleys. Stage 40' slides over the horizontal axes α and β defined by support shaft/rails (not shown but identical to the first embodiment) in the same manner as previously described. Vertical slide 100 moves in response to rotation of drive pulley 88 as also previously described. In this embodiment control handle 36 mounts on slide 100.

What is claimed is:

1. In a force reflecting apparatus having a base and a horizontally moveable stage, the improvement comprising:
   a first motor;
   a first drive shaft linked to the motor;
   a drive pulley axially slidable on the first drive shaft and selectively responsive to horizontal movement of the stage;
   at least one vertical support member slidingly engaged with the stage wherein the at least one vertical support member is connected at a first end to an upper member and to a lower member at a second end;
   a first, a second, a third, and a fourth lateral cable guide located at the stage wherein the first and the fourth cable guides are proximate to one another, and the second and the third cable guides are proximate to one another;
   a first and a second column cable guide wherein the first column guide is located at the upper member and the second column guide is located at the lower member;
   a cable hanger slidingly mounted to the base and selectively responsive to horizontal movement of the stage; and
   a cable having a first end attached to the cable hanger wherein the cable passes about, in order, the first lateral guide, the first column guide, the second lateral guide, the first drive pulley, the third lateral guide, the second column guide, and the fourth lateral cable guide where after the second end of the cable terminates at the cable hanger.

2. The improvement of claim 1 further comprising a second vertical support member slidingly engaged with the stage wherein the second vertical support member is connected at a first end to the upper member and to the lower member at a second end.

3. The improvement of claim 1 further comprising at least one structural support member connected at a first end to the upper member and to the lower member at a second end without engaging the stage.

4. The improvement of claim 1 further comprising a second vertical support member slidingly engaged with the stage and at least one structural support member not engaging the stage, each having a first end and a second end, wherein the second vertical support member and the at least one structural support member are connected at their respective first ends to the upper member and at their respective second ends to the lower member at a second end.

5. The improvement of claim 1 wherein the drive pulley and the cable hangar are linked so that horizontal movement of the drive pulley results in corresponding movement of the hangar.

6. The improvement of claim 1 wherein a cable segment between the first lateral guide and the first column guide, and a cable segment between the first column guide and the second lateral guide are parallel to one another.

7. The improvement of claim 1 wherein a cable segment between the third lateral guide and the second column guide, and a cable segment between the second column guide and the fourth lateral guide are parallel to one another.

8. The improvement of claim 1 wherein a cable segment between the first lateral guide and the first column guide is parallel to a cable segment between the first column guide and the second lateral guide, and wherein a cable segment between the third lateral guide and the second column guide is parallel to a cable segment between the second column guide and the fourth lateral guide.

9. The improvement of claim 1 further comprising a second vertical support member slidingly engaged with the stage and at least one structural support member not engaging the stage, each having a first end and a second end, wherein the second vertical support member and the at least one structural support member are connected at their respective first ends to the upper member and at their respective second ends to the lower member at a second end, and wherein a cable segment between the first lateral guide and the first column guide is parallel to a cable segment between the first column guide and the second lateral guide, and a cable segment between the third lateral guide and the second column guide is parallel to a cable segment between the second column guide and the fourth lateral guide.

10. A force reflecting apparatus having at least three degrees of freedom for providing force reflection to a user comprising:
   a base to provide a mechanical ground;
   a first linear horizontal support member slidingly mounted to the base, the first linear horizontal support member defining a first axis;

a second linear horizontal support member slidingly mounted to the base, the second linear horizontal support member defining a second axis wherein the second axis is substantially orthogonal to the first axis;

a column having an upper member and a lower member, and including a first linear vertical support member slidingly engaged with the stage, the first linear vertical support member defining a third axis orthogonal to the first and second axes, and separating the upper member from the lower member;

a stage to slidingly receive the first and second linear horizontal support members, and the first linear vertical support member;

a first motor coupled to a rotatable first drive shaft;

a first drive pulley slidably mounted about the first drive shaft wherein the first drive pulley is translationally linked to the first linear support member; and cable transmission means for translating rotational movement of the first drive pulley into movement of the platform independent of and unaffected by movement of the stage along the first or second axes.

11. The force reflecting apparatus of claim 10 wherein the cable transmission means comprises a first, a second, a third, and a fourth lateral cable guide located at the stage wherein the first and the fourth cable guides are proximate to one another, and the second and the third cable guides are proximate to one another;

a first column cable guide located at the upper member and a second column cable guide located at the lower member;

a cable hanger linked to the first support member to be selectively responsive to horizontal movement of the stage; and a cable having a first end attached to the cable hanger wherein the cable passes about, in order, the first lateral guide, the first column guide, the second lateral guide, the first drive pulley, the third lateral guide, the second column guide, and the fourth lateral cable guide where after the second end of the cable terminates at the cable hanger.

12. The force reflecting apparatus of claim 10 wherein the column further includes at least one structural support member connected at a first end to the upper member and to the lower member at a second end, without engaging the stage.

13. The force reflecting apparatus of claim 10 wherein the column further includes a second linear vertical support member slidingly engaged with the stage and at least one structural support member not engaging the stage, each having a first end and a second end, wherein the second vertical support member and the at least one structural support member are connected at their respective first ends to the upper member and at their respective second ends to the lower member at a second end.

14. The force reflecting apparatus of claim 10 wherein there is at least one motor for each axis of stage movement.

15. The force reflecting apparatus of claim 10 wherein the first linear horizontal support member has a first end and a second end, each end being slidably linked to the base, and wherein the apparatus further comprises a second motor operatively coupled to the first and second ends of the first linear horizontal support member.

16. The force reflecting apparatus of claim 15 wherein the second motor is coupled to a second drive shaft having an axis substantially parallel to the first axis; and wherein a first cable is frictionally engaged with the second drive shaft and linked to the first end of the first linear horizontal support member, and a second cable is frictionally engaged with the drive shaft and linked to the second end of the first linear horizontal support member.

17. The force reflecting apparatus of claim 10 wherein the second linear horizontal support member has a first end and a second end, each end being slidably linked to the base, and wherein the apparatus further comprises a third motor operatively coupled to the first and second ends of the second linear horizontal support member.

18. The force reflecting apparatus of claim 17 wherein the third motor is coupled to a third drive shaft having an axis substantially parallel to the second axis; and wherein a first cable is frictionally engaged with the third drive shaft and linked to the first end of the second linear horizontal support member, and a second cable is frictionally engaged with the drive shaft and linked to the second end of the second linear horizontal support member.

19. The force reflecting apparatus of claim 10 wherein the first drive shaft is splined and is rotationally linked to a second hangar, and the slidable mounting of the first drive pulley with the first drive shaft further comprises at least one splined cylinder having recirculating ball bearings concentrically disposed over and engaging the first drive shaft, and at least one roller bearing disposed intermediate the first drive pulley and the second hangar, wherein the first drive pulley is in rotational registry with the at least one splined cylinder and rotates relative to the second hangar.

20. In a force reflecting apparatus having a base and a horizontally moveable stage, the improvement comprising:

at least one vertical support member slidingly engaged with the stage wherein the at least one vertical support member is connected at a first end to an upper member and to a lower member at a second end to thereby define a column; and at least one structural support member connected at a first end to the upper member and to the lower member at a second end wherein the at least one structural support member does not engage the stage.

21. The improvement of claim 20 wherein the at least one vertical support member has a circular cross section and is disposed in the stage wherein the stage defines an aperture having a linear bearing therein sized to receive the at least one vertical support member.

22. The improvement of claim 21 wherein the aperture defined by the stage includes a clamp feature whereby the radius of the aperture can be decreased upon tightening of the clamp feature.

23. The improvement of claim 22 further comprising the presence of a dampening material intermediate the stage and the linear bearing.

24. The improvement of claim 20 wherein the at least one vertical support member has an internal volume at least partially filled with a dampening material.

25. In a force reflecting apparatus having a base and a horizontally moveable stage, the improvement comprising:

a first motor mounted to the base;

a first drive shaft linked to the motor;

a drive pulley axially slidable on the first drive shaft and selectively responsive to horizontal movement of the stage;

at least one vertical support column slidingly engaged with the stage wherein the at least one vertical support column is connected at a first end to a pedestal and to an entablature at a second end;

a first, a second, a third, and a fourth lateral cable guide located at the stage wherein the first and the fourth cable guides are proximate to one another; and the second and the third cable guides are proximate to one another;

a first and a second column cable guide wherein the first column guide is located at the entablature and the second column guide is located at the pedestal;

a cable hanger slidingly mounted to the base and selectively responsive to horizontal movement of the stage; and a cable having a first end attached to the cable hanger wherein the cable passes about, in order, the first lateral guide, the first column guide, the second lateral guide, the first drive pulley, the third lateral guide, the second column guide, and the fourth lateral cable guide where after the second end of the cable terminates at the cable hanger.

26. A force reflecting apparatus having at least three degrees of freedom for providing force reflection to a user comprising:

a base to provide a mechanical ground;

a first support shaft slidingly mounted to the base in a first direction;

a second support shaft slidingly mounted to the base in a second direction wherein the second direction is substantially orthogonal to the first direction;

a stage defining a first bore sized to receive the first support shaft and having an axis coincident with the first direction, a second bore sized to receive the second support shaft and having an axis coincident with the second direction, and further defining a third bore having an axis orthogonal to the first shaft direction and the second shaft direction;

a first motor mounted to the base and coupled to a rotatable first drive shaft;

a first drive pulley slidably mounted about the first drive shaft wherein the first drive pulley is translatonally linked to the first support shaft;

a platform including a third support shaft member slidably engaged with the stage wherein the third support shaft member is sized to slidably fit within the stage third bore; and cable transmission means for translating rotational movement of the first drive pulley into vertical movement of the platform independent of and unaffected by movement of the stage in the first or second directions.

* * * * *